United States Patent [19]

Smith

[11] Patent Number: 4,625,453
[45] Date of Patent: Dec. 2, 1986

[54] APPARATUS FOR CAPTURING INSECTS
[76] Inventor: Ulys Smith, Rte. 3, Box 576-A, Greenville, N.C. 27834
[21] Appl. No.: 748,217
[22] Filed: Jun. 24, 1985
[51] Int. Cl.$^4$ .............................................. A01M 1/06
[52] U.S. Cl. ................................................... 43/139
[58] Field of Search ......................... 43/139, 138, 107; 251/155; D32/31, 32; 15/415, 418, 419

[56] References Cited

U.S. PATENT DOCUMENTS

| | | | |
|---|---|---|---|
| 1,533,368 | 4/1925 | Berg | D32/32 |
| 1,671,404 | 5/1928 | Cherry | 43/139 |
| 1,885,854 | 11/1932 | Montellano | 43/139 |
| 2,989,250 | 6/1961 | Simon | 251/155 |
| 3,750,327 | 8/1973 | Thybault | 43/139 |
| 3,862,469 | 1/1975 | Burgoon | 15/418 |
| 4,141,173 | 2/1979 | Weimert | 43/139 |

FOREIGN PATENT DOCUMENTS 631512 11/1961 Canada .................................. 43/139

Primary Examiner—Nicholas P. Godici
Assistant Examiner—G. M. Reid
Attorney, Agent, or Firm—Mills & Coats

[57] ABSTRACT

The present invention provides a clean, sanitary, and safe apparatus for capturing flies, and flying insects from the air. Specifically, the method and apparatus of the present invention entails a timed vacuum source for generating a system of moving air that is induced over an insect induction area. The velocity of the air is increased as it passes over the insect induction area. Flying insects or other insects that move into the vicinity of the induction area are captured and delivered by the moving air to an insect collection area.

4 Claims, 3 Drawing Figures

APPARATUS FOR CAPTURING INSECTS

FIELD OF INVENTION

The present invention relates to insect traps, and more particularily to the use of air flow systems to induce and trap insects.

BACKGROUND OF INVENTION

Removal of insects from areas such as restaurants has traditionally been a three-step process. First, the insects are attracted by light or scent. Second, they must be captured or immobilized. To accomplish this, devices utilized chemicals, electrical cremating and macerators. Finally, the captured insects must be removed, usually by filters or manual cleaning. These methods are unattractive and relatively unsanitary.

Therefore, there is and continues to be a need for a quiet, safe, and sanitary method for removal of insects from the air. Moreover, a real need exists for an aesthetically pleasing apparatus which is compatible with food, small children and interior decor.

SUMMARY AND OBJECTS OF INVENTION

The present invention presents an efficient and practical method and apparatus for trapping and extracting flies and flying insects from the air. The apparatus comprises an induction area including two parallel spaced apart plates.

A vacuum source forms a part of the apparatus and functions to generate a system of moving air that is between the spaced apart plates. The plates are particularly spaced so as to give rise to a "nozzle effect" which has the effect of increasing the velocity of the air passing between the two plates.

Adjustment means is provided to adjust the space between the plates. This varies the air flow velocity and enables the plates to be adjusted for capturing various size insects.

Thus, a fly that alights or moves into the induction area is swept in the accelerating system of air and is transferred to a collection area.

It is, therefore, an object of the present invention to provide a suction type insect trap that is effective and efficient in trapping and collecting insects of all types especially flying insects.

Another object of the present invention is to provide a suction-type insect capturing device with a stationary mounted induction head that is provided with an insect entry area that by its shape and orientation naturally attracts insects thereto where they may be effectively swept into an inwardly moving system of air.

Another object of the present invention is to provide a suction-type insect trap that has the ability to vary the velocity of air passing through the same.

Further, it is an object of the present invention to provide a suction-type insect capturing apparatus where the air moving through the apparatus can be periodically interrupted for economy of operation and surprise to insects.

It is also an object that the insect capturing apparatus of the present invention be designed such that the insect collection area may be located remotely from the insect induction area.

It is a particular object that the entire apparatus, and induction head separately, be compatible with present air filtration systems utilizing air flow to exhaust and filter dust, smoke and odors.

It is an object of the present invention to provide a suction-type insect capturing device that utilizes moving air to immediately remove captured insects from view.

A further object of the present invention is to provide a safe and environmentally clean insect trapping apparatus that does not utilize radiation, cremation or poisons.

It is also an object that the insect capturing system of the present invention be aesthetically appealing.

Another object of the present invention resides in the provision of a suction-type insect capturing device that can be manufactured relatively inexpensively and which provides for minimal maintenance.

Other objects and advantages of the present invention will become apparent from a study of the following description and the accompanying drawings which are merely illustrative of such invention.

DETAILED DESCRIPTION OF INVENTION

Figure 1:
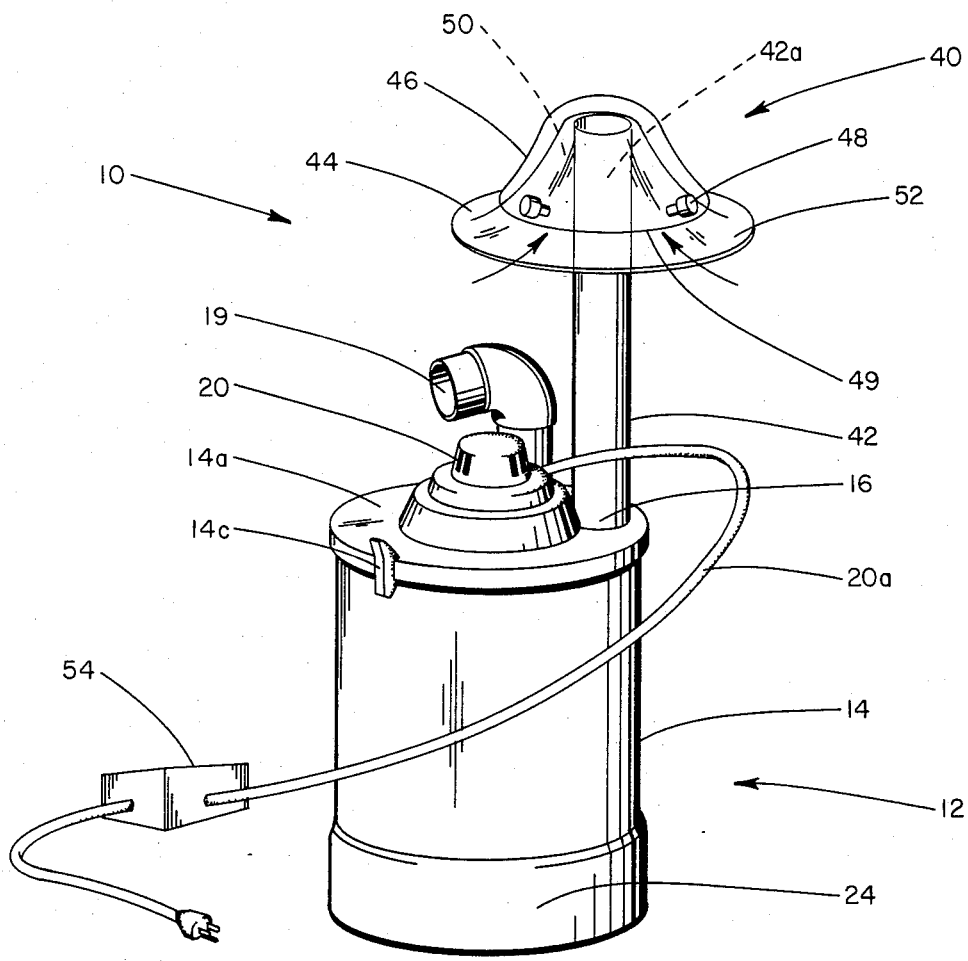
FIG. 1 is a perspective view of the stationary suction-type insect capturing device of the present invention.
Figure 2:
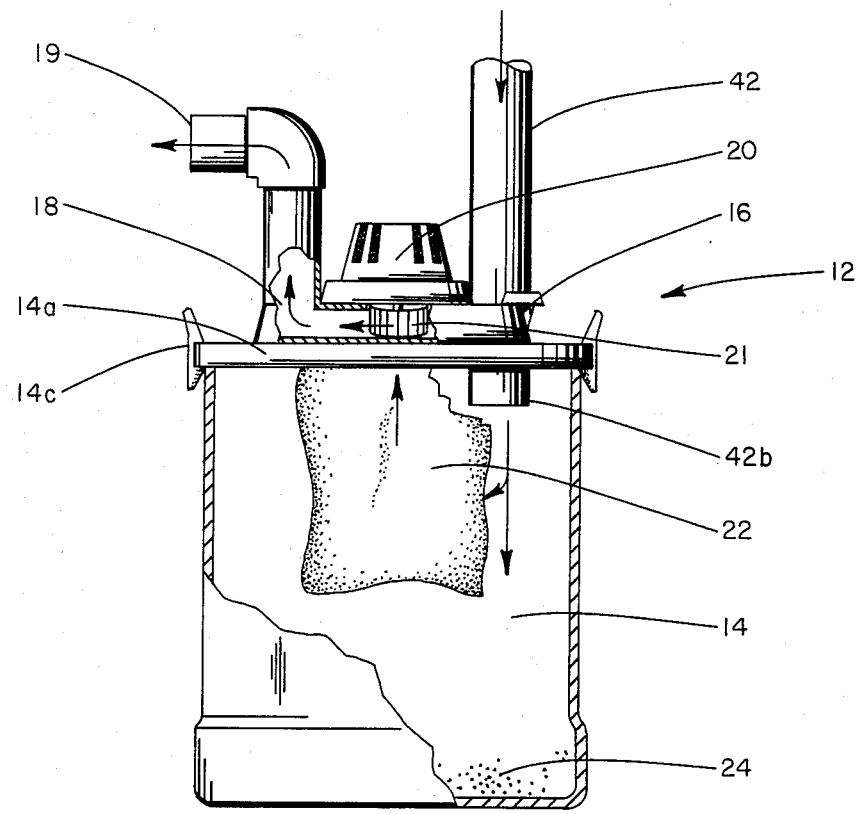
FIG. 2 is a side sectional view of the cannister and vacuum system of the present invention with certain portions broken away to better illustrate features of the invention.

With particular reference to the drawings, the apparatus for capturing insects, specifically flying insects, is indicated generally by the numeral 10.

An analysis of the apparatus may be simplified by division of the structure into its major components, a vacuum system 12 and an insect indication head 40.

Reviewing vacuum system 12, it comprises a cannister 14, a filter 22, a vacuum motor 20 and an exhaust outlet 18.

Cannister 14 serves the dual function of insect collection and serves as a support structure for the apparatus. Cannister 14 may be constructed of any suitable material and in the embodiment shown it is steel. Cannister 14 has a flat circular base with vertical walls. Secured to the top of the walls by a plurality of clamps 14c is a cannister top 14a. Cannister top 14a may be constructed of any suitable material, and in the embodiment shown, the top is made of plastic.

An inlet opening 16 is formed in cannister top 14a. Inlet opening 16 is molded to provide a support structure for a connector conduit 42 and the insect induction head 40. Inlet opening 16 further provides access to the cannister. An insect collection area 24 is defined in the lower portion of the cannister.

Attached to cannister top 14a is a filter 22. The filter 22 is constructed of plastic and covered with foam rubber which in turn is covered with a removable and replaceable paper bag. It is appreciated that filter 22 may be formed and constructed of various materials and may be secured in a number of appropriate locations within the cannister 14.

Molded into cannister top 14a is an outlet opening 18. Opening 18 supports an exhaust deflector 19. Outlet 18 forms a cowled passage to the filter that is of molded plastic integrated into the top.

Disposed between outlet 18, filter 22, and molded into the cannister top 14 is an electric vacuum motor 20 having a drive shaft. Attached to the drive shaft and extending into the duct between the filter 22 and the outlet 18 is a fan blade 21 with the blades pitched to direct the air flow out the outlet 18.

An electric cord 20a extends from the vacuum motor to a variable timer 54. Timer 54 acts to switch the power on and off periodically, alternating between two selected periods. Details of timer 54 are not dealt with herein because they are not per se material to the present invention and because timers are well known in the art.

Reviewing the induction head 40, it comprises a connector conduit 42, a lower bell-shaped plate 44, an upper bell-shaped plate 46, and adjustment screws 48.

Connector conduit 42 is formed by an elongated PVC pipe section that elevates and supports the bell-shaped plates 44 and 46. Connector conduit 42 has an exit opening 42b that is inserted into inlet opening 16 of the cannister top 14a. The opposite end of the connector conduit 42 forms an inlet end 42a.

Lower bell-shaped plate (hereinafter lower plate) 44 is constructed of transparent clear plastic, although any suitable material could be used, and it is secured to inlet end 42a of connector conduit 42. Lower plate 44 includes a central circular opening that aligns with the opening in inlet end 42a of cannister 42. The outer extreme edge of the lower plate 44 is formed into a flat plastic lip that forms an insect alighting area 52.

Figure 3:
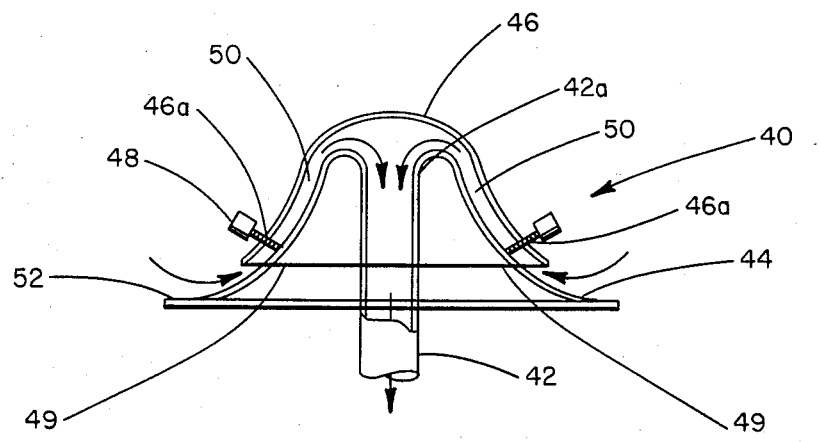
FIG. 3 is a side sectional view of the induction head forming a part of the suction-type insect capturing device of the present invention.

Upper bell-shaped plate 46 (hereinafter upper plate) comprises a transparent clear plastic plate formed such that it sets atop and generally conforms to the shape of lower plate 44 as seen in FIG. 3. The outside diameter of the upper plate 46 is smaller than that of the lower plate 44 thereby exposing alighting area 52.

Located around the outer side or surface of upper plate 46, and spaced equidistant to each other, are three drilled and threaded holes 46a sized to accept three adjustment screws 48. The three adjustment screws 48 are thumbscrews directed from the upper surface of the upper plate 46, through the threaded holes 46a and engage the upper surface of lower plate 44 so as to define a passageway 50 between the upper and lower plates 44 and 46.

By adjusting thumbscrews 48, the distance between lower and upper plates 44 and 46 can be varied. Because air from a system of air is directed through passageway 50 between plates 44 and 46, the velocity of the air passing through this area is likewise varied as the distance between the plates are varied. This is because the plates form and give rise to a "nozzle effect". As will be more fully appreciated after reviewing and studying the present invention in detail, it is this "nozzle effect" that contributes significantly to the effectiveness of the insect trapping apparatus 10. Specifically, as air moves between plates 44 and 46 and passes through passageway 50, the velocity of the air increases and with the increased velocity, there is also acceleration. This tends to induce and positively pull an insect into the stream of air with such force that the insect cannot ordinarily escape.

In operation, flies, flying insects and other insects are visually attracted to induction head 40 and land on or move onto lip 52 of the lower plater 44. Attraction of insects can be augmented by the application of bait, sweetener or other conventional means applied to or near the induction head 40.

As discussed hereinabove, vacuum motor 20 is operatively connected to a timer 54. This is to provide a periodic operation of the insect trapping apparatus 10 of the present invention. It is appreciated that one can select the particular time periods for both on and off operation. It is contemplated that a preferable timing sequence would include the apparatus being in the on mode for ten seconds followed by the off mode for fifty seconds.

During the on mode period, vacuum motor 20 turns fan blade 21 creating an air flow system that passes through the insect trapping apparatus 10. In particular, air is pulled from around induction head 40, as illustrated in FIG. 3, over lip or alighting area 52 and into an entry way 49 to passageway 50. Once air has entered the passageway 50, it is seen that the same moves upwardly through the passageway and the air converges about the top area of the bell-shaped induction head 40. From there the air is induced downwardly through inlet opening 42a of connection conduit 42. From there the air is directed through inlet opening 16 into the body of cannister 14 and on through filter 22 after which the air is exhausted out exhaust 19.

An insect lying or disposed along the alighting area 52 will have a tendency to move upwardly towards the outer terminal edge of upper plate 46. Once the fly or insect reaches this area and vacuum motor 20 is in the on mode, the fly or insect is quickly swept into the upwardly passing air stream. Once this occurs, the fly is carried with the air stream into the cannister 14 where the filter 22 separates the fly from the airstream. The filtered flies fall into the insect collecting area 24 formed within the bottom of cannister 14.

Because of the generally inclined shape of passageway 50, it is appreciated that the cross sectional area generally progressively decreases as the air moves upwardly within passageway 50, as viewed in FIG. 3. Thus, as the air moves upwardly within the bell-shaped induction head 40, it follows that the effective cross-sectional area of the passageway 50 decreases and consequently the velocity of the air will continue to increase. As the velocity of the air increases, it follows that the air flow will also experience significant acceleration. As pointed out above, it is this acceleration and increase of velocity that positively pulls and induces the insect into the system of air and prevents the insect from flying or moving out of the system of moving air. Moreover, the plates themselves serve as a barrier and prevent the insect from moving laterally out of the air stream.

During the off mode time sequence, an opportunity is presented for additional flies and insects to light and accumulate around the lip 52 without the presence of air turbulence which could discourage a fly or insect from moving onto induction head 40.

After the insect trapping apparatus 10 of the present invention has been in use for some time, the flies and other insects caught and collected about the collection area can be discarded. In this regard it should be pointed out that the induction head 40 does not necessarily require being stationed adjacent to or even in the vicinity of the cannister 14. In fact induction head 40 can be located remotely from cannister 14 and its associated vacuum motor 20. Some operations may actually entail the provision of a series of induction heads 40 remotely located and operating from one single cannister and vacuum motor. This would be especially efficient in public facilities such as restaurants.

From the foregoing specification and discussion, it is appreciated that the insect capturing apparatus 10 of the present invention has many advantages over conventional insect trapping devices of the prior art. As discussed before, the present invention is both clean and efficient. Insects captured are swiftly containerized out of sight. Moreover, the device of the present invention can be easily and conveniently moved from one location to another. Finally, the insect capturing device of the present invention does not employ poisonous bait and other offensive attracting and killing components.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An insect capturing device comprising: an insect induction head including upper and lower spaced apart plates defining an air passageway therebetween; said lower plate assuming a generally bell shaped configuration and including a dome-like central portion and a peripheral insect alighting ledge integrally formed therewith, said insect alighting ledge extending circumferentially around said dome-like central portion; said upper plate assuming a dome-like configuration extending radially downwardly and outwardly from a central point and including a terminal edge that terminates inwardly of said peripheral ledge so as to define an open area above said insect alighting area; an insect entry into said air passageway formed by the terminal edge of said upper plate and the underlying portion of said lower plate; a suction opening formed in the central portion of said lower plate and is communicatively connected with said air passageway; adjustment means associated with said upper and lower plates for adjusting the spacing therebetween in order that the velocity of the air flow passing therethrough can be accordingly varied; and vacuum means operatively connected with said suction opening for generating a system for moving air and directing the same across said insect alighting area and through said induction head thereby pulling insects alighting on said insect alighting ledge through said air passageway to a central portion thereof and into and through said suction opening.

2. The insect capturing device of claim 1 including timer means operatively connected to said vacuum means for periodically actuating said vacuum means and generating said system of moving air that passes through said insect induction head thereby periodically interrupting any turbulence, noise or the like about the insect induction head so as to not frigthen insects away from the induction head before they have an opportunity to alight and move into an area thereon where the generated system of air will sweep them inwardly through the induction head.

3. The stationary suction-type insect capturing device of claim 1 wherein said passageway defined by said plates decreases in cross-sectional area between said insect inlet and said suction opening.

4. An insect capturing device comprising: an insect induction head including upper and lower spaced apart plates defining an air passageway therebetween; said lower plate having a generally bell shaped configuration and including an insect alighting ledge extending around the perimeter thereof; said upper plate having a dome-like configuration and including a terminal edge that terminates inwardly of said insect alighting ledge so as to define an open area thereabove; a circumferential inlet into said air passageway formed by the terminal edge of said upper plate and the underlying portion of said lower plate; a suction opening formed in the central portion of said lower plate and communicatively connected with said air passageway; and vacuum means operatively connected with said suction opening for generating a system of moving air and directing the same across said insect alighting ledge and through said induction head thereby pulling insects alighting on said insect alighting ledge through said air passageway to a central portion thereof and into and through said suction opening.

* * * * *